(12) United States Patent  
Kohyama et al.

(10) Patent No.: US 11,888,128 B2  
(45) Date of Patent: Jan. 30, 2024

(54) NON-AQUEOUS ELECTROLYTE SECONDARY BATTERY AND METHOD FOR PRODUCING NON-AQUEOUS ELECTROLYTE SECONDARY BATTERY

(71) Applicant: PRIME PLANET ENERGY & SOLUTIONS, INC., Tokyo (JP)

(72) Inventors: Akira Kohyama, Toyoake (JP); Hideki Sano, Ikeda (JP); Naoto Onodera, Kobe (JP); Azusa Nakanishi, Toyota (JP)

(73) Assignee: Prime Planet Energy & Solutions, Inc., Tokyo (JP)

( * ) Notice: Subject to any disclaimer, the term of this patent is extended or adjusted under 35 U.S.C. 154(b) by 0 days.

(21) Appl. No.: 17/691,238

(22) Filed: Mar. 10, 2022

(65) Prior Publication Data

US 2022/0320610 A1 Oct. 6, 2022

(30) Foreign Application Priority Data

Mar. 30, 2021 (JP) ................................. 2021-057178

(51) Int. Cl.
*H01M 10/44* (2006.01)
*H01M 50/183* (2021.01)
*H01M 10/04* (2006.01)

(52) U.S. Cl.
CPC ..... *H01M 10/446* (2013.01); *H01M 10/0431* (2013.01); *H01M 50/183* (2021.01)

(58) Field of Classification Search
CPC ........... H01M 10/446; H01M 10/0431; H01M 50/183; H01M 10/052; H01M 10/0587; H01M 10/0525; H01M 50/538; H01M 4/0447; H01M 50/103
See application file for complete search history.

(56) References Cited

U.S. PATENT DOCUMENTS

| | | |
|---|---|---|
| 2014/0315072 A1 | 10/2014 | Kobayashi et al. |
| 2016/0036010 A1 | 2/2016 | Saruwatari et al. |
| 2016/0380299 A1* | 12/2016 | Umeyama ............. H01M 4/525 |
| | | 429/94 |

(Continued)

FOREIGN PATENT DOCUMENTS

| | | |
|---|---|---|
| JP | 2005-108682 A | 4/2005 |
| JP | 2010-009983 A | 1/2010 |
| JP | 2010-021104 A | 1/2010 |

(Continued)

*Primary Examiner* — Daniel S Gatewood
(74) *Attorney, Agent, or Firm* — Finnegan, Henderson, Farabow, Garrett & Dunner, LLP

(57) ABSTRACT

Provided is a technique for suppressing the formation of black regions in a wound electrode body. The production method disclosed herein is a method for producing a non-aqueous electrolyte secondary battery that includes a wound electrode body, a non-aqueous electrolyte, and a battery case. This production method includes the following steps: an assembling step S1 of placing the wound electrode body and the non-aqueous electrolyte in the battery case to construct a secondary battery assembly; a first step S2 of performing initial charging on the secondary battery assembly; and a second step S3 of setting the temperature of the wound electrode body to 50° C. or lower and keeping this state for at least 72 hours after the first step.

11 Claims, 8 Drawing Sheets

(56) References Cited

U.S. PATENT DOCUMENTS

2018/0123173 A1    5/2018  Shirane et al.
2020/0161698 A1    5/2020  Higuchi

FOREIGN PATENT DOCUMENTS

| | | | |
|---|---|---|---|
| JP | 2012-084332 A | | 4/2012 |
| JP | 2016-035900 A | | 3/2016 |
| JP | 2016-058264 A | | 4/2016 |
| JP | 2019-040696 A | | 3/2019 |
| JP | 2019040696 A | * | 3/2019 |
| WO | WO 2013/065187 A1 | | 5/2013 |
| WO | WO 2019/044560 A1 | | 3/2019 |

* cited by examiner ved from gas production have been demanded. Now, WO 2019/044560 is cited as an example of prior art relating to gas production in an electrode body. The method for producing a secondary battery disclosed in this patent literature proposes that a secondary battery precursor is provided in a standing manner such that the secondary battery precursor has an opening at the top in the vertical direction, and initial charging is performed while the produced gas is released from the opening. The patent literature describes that charging unevenness due to bubbles can be sufficiently prevented in a secondary battery precursor by the above production method.

NON-AQUEOUS ELECTROLYTE SECONDARY BATTERY AND METHOD FOR PRODUCING NON-AQUEOUS ELECTROLYTE SECONDARY BATTERY

CROSS REFERENCE TO RELATED APPLICATIONS

This application claims the benefit of foreign priority to Japanese Patent Application No. 2021-057178, filed on Mar. 30, 2021, the entire contents of which are incorporated herein by reference.

BACKGROUND OF THE DISCLOSURE

1. Technical Field

The present invention relates to a non-aqueous electrolyte secondary battery and a method for producing the non-aqueous electrolyte secondary battery.

2. Background

Secondary batteries such as lithium ion secondary batteries are currently used in a wide variety of fields such as vehicles and mobile devices. Typical examples of this kind of secondary battery include a non-aqueous electrolyte secondary battery including an electrode body with a positive electrode plate and a negative electrode plate, a non-aqueous electrolyte, and a battery case housing the electrode body and the non-aqueous electrolyte.

In producing a non-aqueous electrolyte secondary battery, a secondary battery assembly in a state where an electrode body and a non-aqueous electrolyte are housed in a battery case is generally charged as initial charging. The initial charging can form a so-called SEI coating on the surface of a negative electrode plate. Meanwhile, gas derived from components in a secondary battery assembly can be produced in the electrode body during initial charging. Such gas production in an electrode body may cause the occurrence of charging unevenness in an electrode body. Thus, technical developments for suppressing the occurrence of charging unevenness deri

SUMMARY OF THE INVENTION

By the way, a flat-shaped wound electrode body in which a belt-shaped positive electrode plate and a belt-shaped negative electrode plate are wound with a belt-shaped separator intervened therebetween is mentioned as one example of the above electrode body. In recent years, non-aqueous electrolyte secondary batteries with higher energy have been demanded with the spread of secondary batteries. To satisfy such demands, the present inventors have considered, for example, enlarging the formation width of an electrode active material layer on a positive electrode plate or a negative electrode plate (that is, the length in the winding axis direction of a wound electrode body). However, the present inventors have learned that, when a part of a wound electrode body with a larger formation width of electrode active material layers is subjected to initial charging and high-temperature aging, black regions that are blacker than other regions may be formed in some regions of the wound electrode body. Furthermore, the present inventors have found that the black regions have higher resistance than other regions, and therefore, a non-aqueous electrolyte secondary battery including a wound electrode body with black regions formed therein may show poorer battery characteristics (for example, the capacity retention rate or the like). Then, the results of an intensive study by the present inventors have revealed that parts, where a good-quality SEI coating is not formed, is produced in a negative electrode active material layer due to the gas production during the initial charging, and if high-temperature aging is performed in this state, a poor-quality coating (that is, the black region) is formed.

The present invention has been made for solving such a problem and has an object to provide a technique for suppressing the formation of black regions in a wound electrode body in a non-aqueous electrolyte secondary battery provided with the wound electrode body.

The production method disclosed herein is a method for producing a non-aqueous electrolyte secondary battery that includes a flat-shaped wound electrode body in which a belt-shaped positive electrode plate and a belt-shaped negative electrode plate are wound, with a belt-shaped separator being intervened therebetween, a non-aqueous electrolyte, and a battery case that houses the wound electrode body and the non-aqueous electrolyte. The negative electrode plate includes a negative electrode core, and a negative electrode active material layer formed on the negative electrode core. The negative electrode active material layer has a length of at least 20 cm in a winding axis direction of the wound electrode body. This production method includes the following steps: an assembling step of placing the wound electrode body and the non-aqueous electrolyte in the battery case to construct a secondary battery assembly; a first step of performing initial charging on the secondary battery assembly; and a second step of setting the temperature of the wound electrode body to 50° C. or lower and keeping this state for at least 72 hours after the first step.

In the production method of the above constitution, initial charging in the first step is performed, and then the secondary battery assembly is left at a predetermined non-high temperature state for a predetermined time in the second step. Due to this feature, gas produced in the wound electrode body at the initial charging is sufficiently released to the outside of the wound electrode body, and a good-quality coating can be additionally formed in a part where a good-quality coating has not been formed due to this gas. For this reason, the formation of black regions in the wound electrode body, as mentioned above, can be suppressed.

In a suitable embodiment of the production method disclosed herein, the second step is performed in a condition where the secondary battery assembly is restrained in a thickness direction of the wound electrode body. Performing the second step in a state where the secondary battery assembly is restrained can promote the gas release to the outside of the wound electrode body. Thus, the effect of suppressing the formation of the black regions can be enhanced more greatly.

A non-aqueous electrolyte secondary battery having the following constitution can be produced when the production method disclosed herein is used. In the non-aqueous electrolyte secondary battery, the battery case includes an exterior body including an opening and a bottom part opposite to the opening, and a sealing plate configured to seal the opening, and the wound electrode body is arranged in the exterior body in a direction such that the winding axis is parallel to the bottom part.

The technique disclosed herein provides a non-aqueous electrolyte secondary battery that includes a flat-shaped wound electrode body in which a belt-shaped positive electrode plate and a belt-shaped negative electrode plate are wound, with a belt-shaped separator being intervened therebetween, a non-aqueous electrolyte, and a battery case that houses the wound electrode body and the non-aqueous electrolyte. The negative electrode plate includes a negative electrode core and a negative electrode active material layer formed on the negative electrode core. The negative electrode active material layer has a length of at least 20 cm in a winding axis direction of the wound electrode body. Here, in a winding start edge region in the negative electrode plate, a ratio (Rmax/Rave) of the maximum plate resistance Rmax of the region to the average plate resistance Rave of the edge region is 2.7 or less. In a non-aqueous electrolyte secondary battery of such a constitution, the local resistance increase is suppressed in the winding start edge region in a negative electrode plate. Therefore, the decrease of the battery performance is suppressed in the non-aqueous electrolyte secondary battery.

In a preferred embodiment of the non-aqueous electrolyte secondary battery disclosed herein, the battery case includes an exterior body that includes an opening and a bottom part opposite to the opening and a sealing plate configured to seal the opening. The exterior body has a pair of opposing large-area sidewalls and a pair of opposing small-area sidewalls with a smaller area than the large-area sidewalls. The distance between the pair of large-area sidewalls is at least 3 cm. The wound electrode body is provided in plurality and the exterior body houses the plurality of wound electrode bodies therein. As stated above, the decrease of the battery performance is suppressed in the non-aqueous electrolyte secondary battery disclosed herein. Thus, providing a plurality of wound electrode bodies can efficiently produce the energy from a non-aqueous electrolyte secondary battery.

One embodiment of the non-aqueous electrolyte secondary battery disclosed herein includes a positive electrode current collector and a negative electrode current collector electrically connected to the wound electrode body, a positive electrode tab group including a plurality of tabs protruding from one end in the winding axis direction of the wound electrode body, and a negative electrode tab group including a plurality of tabs protruding from another end in the same direction of the wound electrode body. The positive electrode current collector and the positive electrode tab group are connected, and the negative electrode current collector and the negative electrode tab group are connected. The effect of the technique disclosed herein can be appropriately exhibited in a non-aqueous electrolyte secondary battery of the above constitution.

DETAILED DESCRIPTION OF THE PREFERRED EMBODIMENTS

Some suitable embodiments of the technique disclosed herein are described below with reference to drawings. Matters other than those specifically mentioned in the description but necessary for the implementation of the present invention (for example, general constitutions and production processes of secondary batteries not characterizing the technique disclosed herein) may be recognized as design matters for a person skilled in the art based on conventional techniques in the art. The technique disclosed herein can be implemented based on the content disclosed in the present description and a common general technical knowledge in the art.

The term "secondary battery" used in the present description refers to power storage devices in general capable of being discharged and charged repeatedly and encompasses so-called storage batteries (chemical batteries), such as lithium ion secondary batteries, and capacitors (physical batteries), such as electric double-layer capacitors. In the description, the term "active material" refers to a material capable of reversibly occluding and releasing electric charge carriers (for example, lithium ions).

The symbol X represents a "depth direction", the symbol Y represents a "width direction", and the symbol Z represents a "height direction" in each figure referred to in the present description. In the depth direction X, F denotes the "front", and Rr denotes the "rear". In the width direction Y, L denotes the "left", and R denotes the "right". In the height direction Z, U denotes "upward", and D denotes "downward". However, these are directions defined for explanatory convenience and not intended to limit the mode of installation of a secondary battery. The expression "A to B" indicating a numerical range in the present description encompasses a meaning of "A or more and B or less", as well as "over A and below B".

First Embodiment

Figure 1:
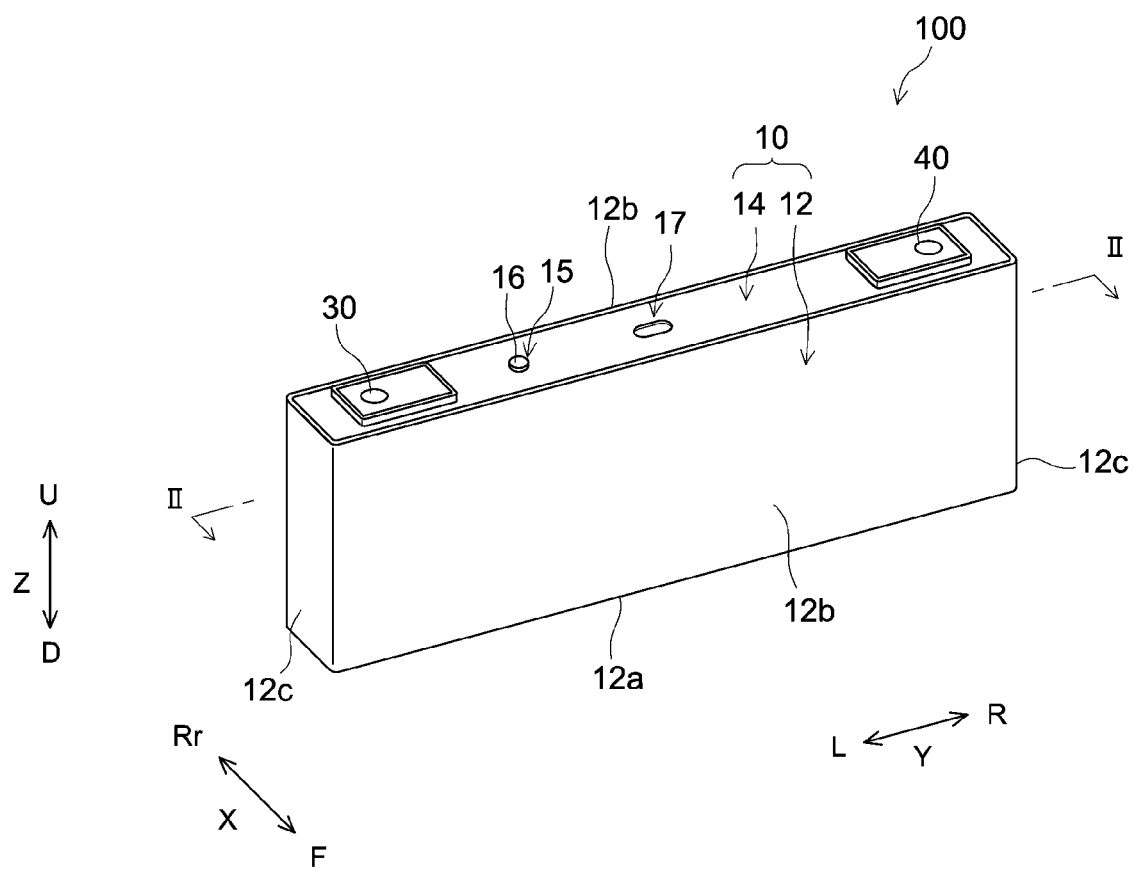
FIG. 1 is a perspective view schematically illustrating a non-aqueous electrolyte secondary battery produced by the production method according to a first embodiment.
Figure 2:
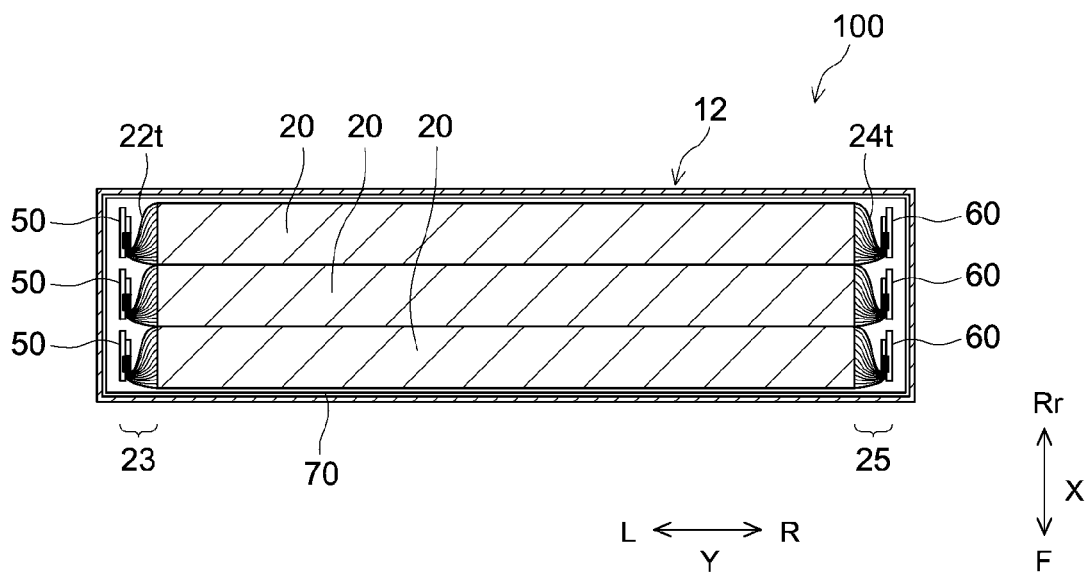
FIG. 2 is a schematic cross-sectional view along the line II-II in FIG. 1.

One example of a non-aqueous electrolyte secondary battery produced in the production method disclosed herein is illustrated in FIGS. 1 and 2. A non-aqueous electrolyte secondary battery 100 includes a wound electrode body 20, a non-aqueous electrolyte (not illustrated), and a battery case 10 housing the wound electrode body and the non-aqueous electrolyte. The non-aqueous electrolyte secondary battery 100 here is a lithium ion secondary battery.

The non-aqueous electrolyte may contain anon-aqueous solvent and a supporting electrolyte. As the non-aqueous solvent, organic solvents such as various carbonates used in a general lithium ion secondary battery may be used without any particular limitations. Specific examples of non-aqueous electrolytes include linear carbonates such as dimethyl carbonate (DMC), ethyl methyl carbonate (EMC), and diethyl carbonate (DEC); cyclic carbonates such as ethylene carbonate (EC), propylene carbonate (PC), butylene carbonate (BC), methyl ethylene carbonate, and ethyl ethylene carbonate; fluorinated linear carbonates such as methyl 2,2,2-trifluoroethyl carbonate (MTFEC); and fluorinated cyclic carbonates such as monofluoroethylene carbonate (FEC) and difluoroethylene carbonate (DFEC). These non-aqueous solvents may be used singly or in a combination of two or more of these.

Examples of supporting electrolytes include $LiPF_6$, $LiBF_4$, and the like. The concentration of a supporting electrolyte in the non-aqueous electrolyte may be set within the range of 0.7 mol/L to 1.3 mol/L. The non-aqueous electrolyte may contain other components than the components described above, such as a film-forming agent, including an oxalato complex compound containing a boron (B) atom and/or a phosphorus (P) atom (for example, lithium bis(oxalato)borate (LiBOB)), vinylene carbonate (VC), lithium difluorophosphate, or the like; and a gas-forming agent, including biphenyl (BP), cyclohexylbenzene (CHB) or the like. As long as the effect of the technique disclosed herein is not remarkably impaired, a conventionally known additive such as a thickener and a dispersant.

The non-aqueous solvent is preferably a cyclic carbonate from the point of view to preferably achieve the effect of the technique disclosed herein. Among them, ethylene carbonate (EC) may preferably be used. From the same point of view, the coating formation agent is preferably vinylene carbonate (VC).

The battery case 10 includes an exterior body 12 with an opening and a sealing plate (lid) 14 for sealing the opening. The exterior body 12 and the sealing plate 14 of the battery case 10 are integrated by joining the sealing plate 14 on the periphery of the opening of the exterior body 12 to airtightly seal (tightly seal) the battery case 10. The exterior body 12 is a bottomed rectangular tube-shaped rectangular exterior body including the opening, a rectangular bottom part 12a opposite to the opening, a pair of large-area side walls 12b standing from the long sides of the bottom part 12a, and a pair of small area side walls 12c standing from the short sides of the bottom part 12a. The small-area sidewalls 12c have smaller areas than the large-area sidewalls 12b. The sealing plate 14 is provided with a liquid injection hole 15 for a non-aqueous electrolyte, a gas exhaust valve 17, a positive electrode terminal 30, and a negative electrode terminal 40. The liquid injection hole 15 is sealed with a sealing member 16. The positive electrode terminal 30 and the negative electrode terminal 40 are electrically connected to the wound electrode body 20 housed in the battery case 10. The battery case 10 is, for example, made of metal. Examples of metal materials constituting the battery case 10 include aluminum, aluminum alloys, iron, iron alloys, and the like.

The size of the battery case 10 is not particularly restricted. As described below, when a plurality of wound electrode bodies 20 are housed in the exterior body 12 in some embodiments, the distance between a pair of large-area sidewalls 12b may be appropriately set according to the number, size, or the like, of the wound electrode bodies 20 to be housed. The distance is, for example, at least 3 cm, and may be 3 cm or more, may be 4 cm or more, and may be 5 cm or more. Furthermore, the distance may be, for example, 10 cm or less, may be 8 cm or less, or may be 6 cm or less.

The wound electrode body 20 is a power generation element of the non-aqueous electrolyte secondary battery 100 and is provided with a positive electrode plate, a negative electrode plate, and a separator. In the present embodiment, a plurality (for example, two or more, three or more, or four or more; three in FIG. 2) of wound electrode bodies 20 are housed in the battery case 10 (exterior body 12) so as to be arranged in the depth direction X as illustrated in FIG. 2. As illustrated in FIGS. 1 to 4, the wound electrode bodies 20 are arranged in the exterior body 12 in a direction such that the winding axis WL is parallel to the bottom part 12a. The wound electrode body 20 is housed in the battery case 10 in a state of being housed in the electrode body holder 70. Note that constituent materials of the members (such as a positive electrode plate, a negative electrode plate and a separator) constituting the wound electrode body 20 are not particularly limited and may be materials that can be used for general non-aqueous electrolyte secondary batteries and do not limit the technique disclosed herein. Therefore, the detailed description about such constituent materials may be omitted in some cases.

The length L1 in the winding axis WL direction of the wound electrode body 20 is at least 20 cm and may be set to, for example, 20 cm or longer or 30 cm or longer. The above length L1 may be, for example, 60 cm or shorter, 50 cm or shorter, or 40 cm or shorter. Note that the above length L1 does not include either the length of the positive electrode tab 22t and the length of the negative electrode tab 24t mentioned below.

Figure 3:
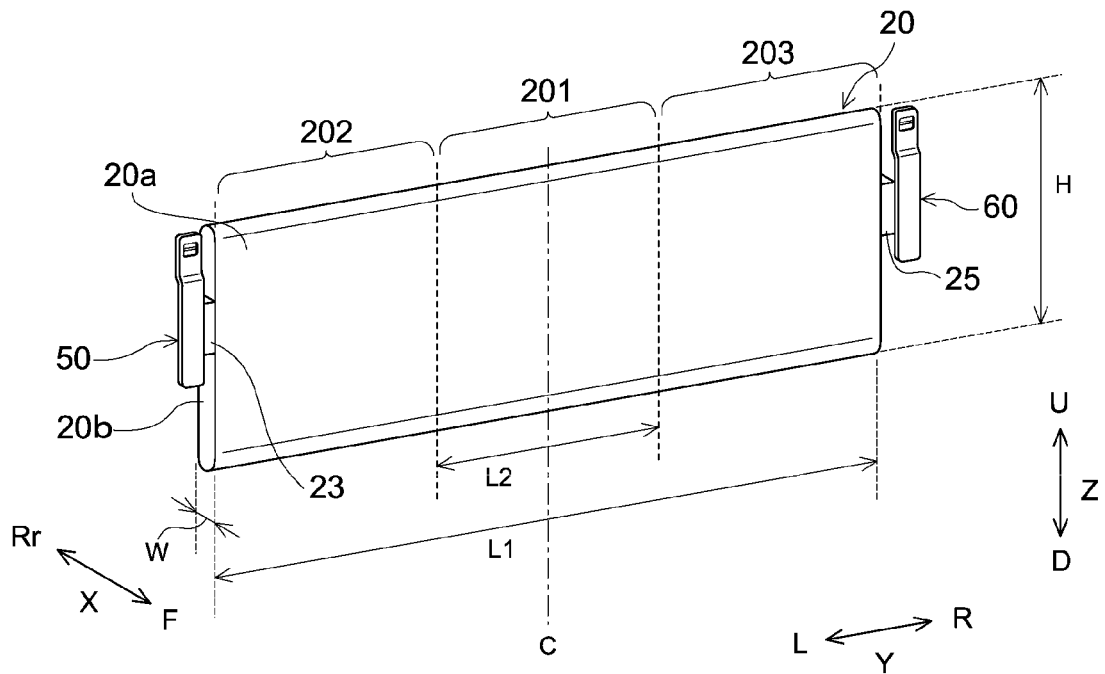
FIG. 3 is a perspective view schematically illustrating a wound electrode body used in the production method according to the first embodiment.
Figure 4:
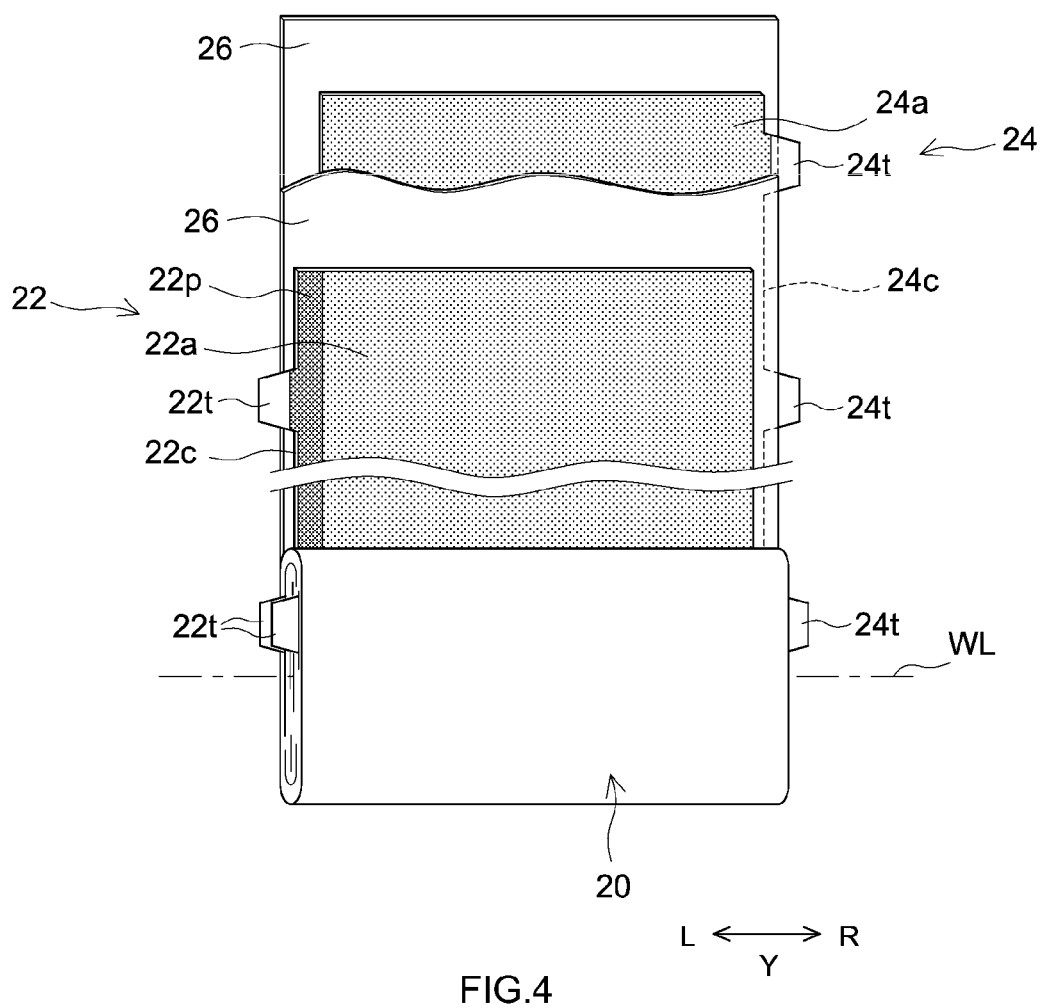
FIG. 4 is a schematic view illustrating a constitution of a wound electrode body used in the production method according to the first embodiment.

As illustrated in FIG. 4, the wound electrode body 20 includes a positive electrode plate 22 and a negative electrode plate 24. The wound electrode body 20 is a flat-shaped wound electrode body in which a long belt-shaped positive electrode plate 22 and a long belt-shaped negative electrode plate 24 are wound around the winding axis WL orthogonal to the longitudinal direction while a long belt-shaped separator 26 is intervened therebetween. As illustrated in FIG. 3, the wound electrode body 20 has a pair of flat parts 20a and a pair of edges 20b in the width direction Y. An edge 20b is a laminated surface of a positive electrode plate 22, a negative electrode plate 24, and a separator 26, and opened to the outside of the wound electrode body 20.

The positive electrode plate 22 has a long belt-shaped positive electrode core 22c (for example, an aluminum foil, an aluminum alloy foil, and the like) and a positive electrode active material layer 22a secured on at least one surface (preferably both surfaces) of the positive electrode core body 22c. Hereinafter, "positive electrode core" may be also termed "a positive electrode core body." Although not particularly restricted, a positive electrode protection layer 22p may optionally be formed on one side edge in the width direction Y of the positive electrode plate 22. A plurality of positive electrode tabs 22t are disposed at one edge (the left edge in FIG. 4) in the width direction Y of positive electrode core body 22c. The plurality of positive electrode tabs 22t each protrude toward one side (the left side in FIG. 4) in the width direction Y. The plurality of positive electrode tabs 22t are disposed at intervals (intermittently) along the longitudinal direction of the positive electrode plate 22. A positive electrode tab 22t is a part of a positive electrode core body 22c and a part (core body exposed part) where a positive electrode active material layer 22a and a positive electrode protection layer 22p of the positive electrode core body 22c are not formed. The plurality of positive electrode tabs 22t are stacked at one edge (the left edge in FIG. 4) in the width direction Y and constitutes a positive electrode tab group 23 including a plurality of positive electrode tabs 22t. A positive electrode current collector 50 is joined to the positive electrode tab group 23 (see FIGS. 2 to 4).

The size of the positive electrode plate 22 may be set such that the above length L1 of the wound electrode body 20 can be achieved. The length of the positive electrode plate 22 in the winding axis WL direction may be set to, for example, at least 20 cm, or at least 30 cm. The above length may be, for example, up to 60 cm, up to 50 cm, or up to 40 cm. Note that the above length does not include the length of the positive electrode tab 22t.

The negative electrode plate 24 has a long belt-shaped negative electrode core body 24c (for example, a copper foil, a copper alloy foil, and the like) and a negative electrode active material layer 24a secured on at least one surface (preferably both surfaces) of the negative electrode core body 24c. Hereinafter, "negative electrode core" may be also termed "a negative electrode core body." A plurality of negative electrode tabs 24t are disposed at one edge (the right edge in FIG. 4) in the width direction Y of negative electrode core body 24c. The plurality of negative electrode tabs 24t each protrude toward one side (the right side in FIG. 4) in the width direction Y. The plurality of negative electrode tabs 24t are disposed at intervals (intermittently) along the longitudinal direction of the negative electrode plate 24. A negative electrode tab 24t here is a part of a negative electrode core body 24c and a part (core body exposed part) where a negative electrode active material layer 24a of the negative electrode core body 24c is not formed. The plurality of negative electrode tabs 24t are stacked at one edge (the right edge in FIG. 4) in the width direction Y and constitutes a negative electrode tab group 25 including a plurality of negative electrode tabs 24t. A negative electrode current collector 60 is joined to the negative electrode tab group 25 (see FIGS. 2 to 4).

The size of the negative electrode plate 24 may be set such that the above length L1 of the wound electrode body 20 can be achieved. The length of the negative electrode plate 24 (for example, the length of the negative electrode active material layer 24a) in the winding axis W L direction is at least 20 cm and may be set to, for example, 20 cm or longer, or 30 cm or longer. The above length may be, for example, 60 cm or shorter, 50 cm or shorter, or 40 cm or shorter. Note that the above length does not include the length of the negative electrode tab 24t.

By the way, when initial charging of the secondary battery assembly is performed, a negative electrode active material decomposes organic substances (for example, additives such as non-aqueous electrolyte components or a film formation agent) in contact with the negative electrode active material at a predetermined potential or higher. Such decomposed products deposit on the surface of the negative electrode active material layer as an SEI coating. An SEI coating does not have electronic conductivity but allows ions to pass through because it is not a complete continuous membrane. Therefore, an SET coating stabilizes and/or inactivates the active material surface to suppress the excessive decomposition of non-aqueous electrolyte components or the like. Meanwhile, gas derived from components (for example, moisture, constituent components of non-aqueous electrolyte, or the like) in a secondary battery assembly can be produced in the electrode body during initial charging. The gas produced in the electrode body is released from the open surface of the electrode body to the outside of the electrode body. Here, when the electrode body has a constitution, for example, like the wound electrode body 20, the gas is limitedly released only from the edge 20b, the open surface of the wound electrode body 20, and therefore, part of the produced gas tends to remain in the electrode body.

Figure 5:
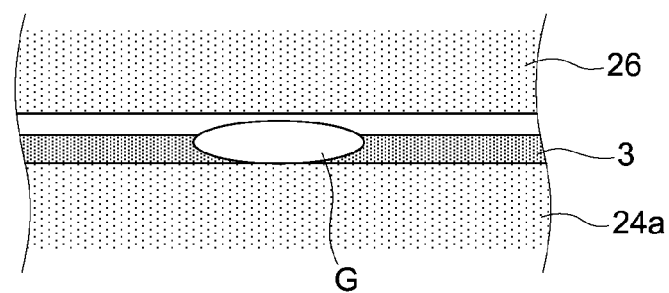
FIG. 5 is a schematic view for explaining the state on the negative electrode active material layer after initial charging.

The inventors infer the following mechanism about the formation of black regions due to gas production during initial charging. As illustrated in FIG. 5, a coating 3 (SET coating) is formed on the surface of the negative electrode active material layer 24a after initial charging. The gas G exists between the negative electrode active material layer 24a and the separator 26. Since the charging reaction is hard to occur in a part where the gas G exists, the formation of the coating 3 is inhibited. The gas G is released to the outside of the wound electrode body 20 by the subsequent high-temperature aging or the like. Since the formation of the coating 3 is insufficient in a part where the gas G is removed, non-aqueous electrolyte components and a negative electrode active material rapidly react with each other at a high temperature, for example. As a result, a poor-quality coating (black region) with different properties than the coating 3 is formed. Since the black regions have higher resistance than other regions, charging unevenness occurs in the wound electrode body 20 due to the formation of the black regions, and the battery characteristics of the non-aqueous electrolyte secondary battery may be lowered.

Figure 6:
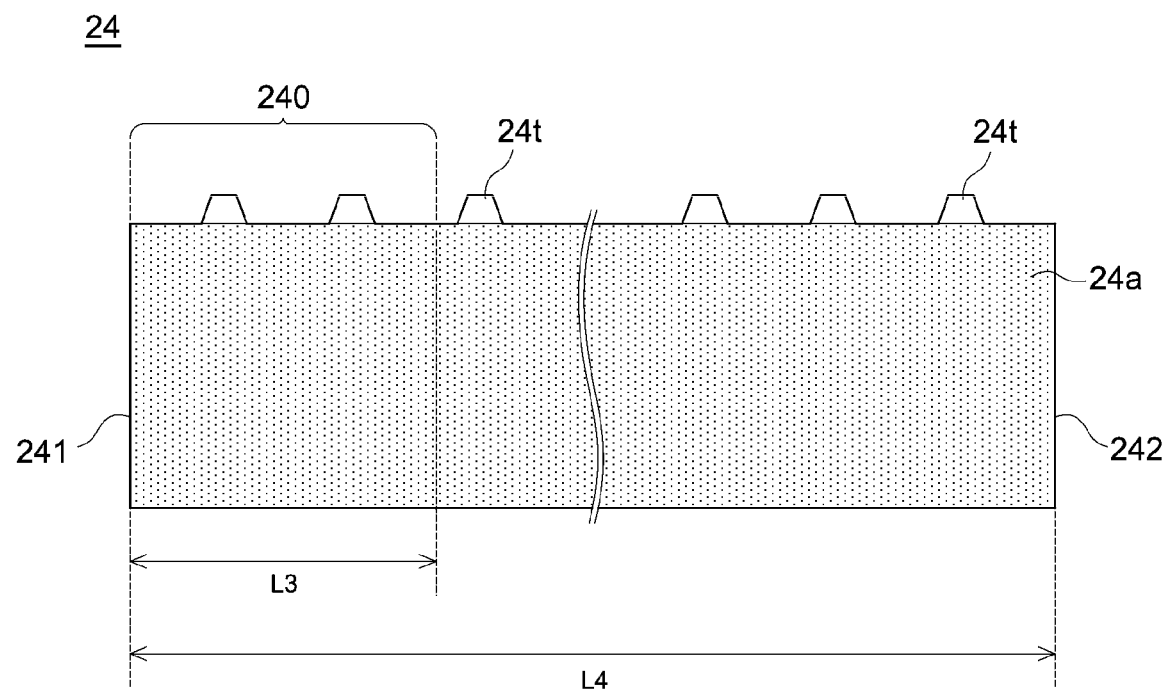
FIG. 6 is a plan view for explaining the winding start edge region in the negative electrode plate used in the production method according to the first embodiment.

In addition, the present inventors have found as a result of the study that the black regions tend to be formed in a winding start edge region of the negative electrode plate 24 (specifically, on the negative electrode active material layer 24a). Among them, it has been found that the black regions are highly frequently formed in a part overlapping the central part 201 of the wound electrode body 20 (see FIG. 3). As illustrated in FIG. 6, the winding start edge region 240 refers to a region from the winding start edge 241 in the negative electrode plate 24 toward the other edge 242 in the longitudinal direction of the negative electrode plate 24 by a length L3. A ratio (L3/L4) of the length L3 in the longitudinal direction of the winding start edge region 240 to the length L4 in the same direction of the negative electrode plate 24 may be, for example, not less than $\frac{1}{10}$, not less than $\frac{1}{8}$, not less than $\frac{1}{5}$, and not more than $\frac{1}{2}$ or less, not more than $\frac{1}{3}$, and not more than $\frac{1}{4}$. In FIG. 6, the number of formed negative electrode tabs 24t in the winding start edge region 240 does not limit the setting in the winding start edge region at all.

The central part 201 refers to a region including the center line C in the width direction Y of a flat part 20a of the wound electrode body 20. A ratio (L2/L1) of the length L2 of the central part 201 to the length L1 in the same direction may be, for example, not lower than $\frac{1}{6}$ or not lower than $\frac{1}{4}$, and not larger than $\frac{1}{2}$ or not larger than $\frac{1}{3}$. The expression "including the centerline C" means that the centerline C has only to pass the central part 201, and for example, the distance between the centerline of the central part 201 and the center line C is $\frac{1}{4}$ of L2 or smaller.

Figure 7:
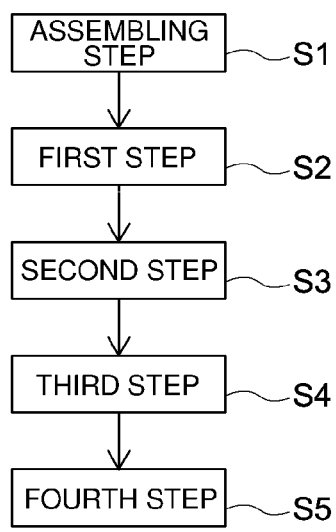
FIG. 7 is a flow chart of the production method of the non-aqueous electrolyte secondary battery in the first embodiment.

The results of an intensive study by the present inventors revealed that the formation of the black regions can be suppressed by producing a non-aqueous electrolyte secondary battery using a technique disclosed herein. As illustrated in FIG. 7, this production method at least includes assembling step S1, a first step S2, and a second step S3. The assembling step S1 includes placing a wound electrode body and a non-aqueous electrolyte in a battery case to construct a secondary battery assembly. First, the wound electrode body 20 is constructed using the materials mentioned above in a conventionally known method. Next, the positive electrode current collector 50 is attached to the positive electrode tab group 23 of the wound electrode body 20, and the negative electrode current collector 60 is attached to the negative electrode tab group 25 to prepare a combined object (first combined object) of the wound electrode body and the electrode current collector (see FIG. 3). In the present embodiment, three first combined objects are prepared.

Next, three first combined objects and a sealing plate 14 are integrated to prepare a second combined object. Specifically, for example, a positive electrode terminal 30 attached in advance to the sealing plate 14 is joined to the positive electrode current collector 50 of a first combined object. Similarly, a negative electrode terminal 40 attached in advance to the lid 14 is joined to the negative electrode current collector 60 of the first combined object. Examples of join means which may be used include ultrasonic joining, resistance welding, laser welding, and the like.

Next, the second combined object is placed in the exterior body 12. Specifically, for example, three wound electrode bodies 20 are placed in an electrode body holder 70 constructed by folding an insulating resin sheet (for example, a polyolefin sheet such as a polyethylene (PE) sheet) into a bag shape or a box shape. Then, a wound electrode body 20 covered with the electrode body holder 70 is inserted into the exterior body 12. The sealing plate 14 is superimposed on the opening of the exterior body 12 in this state, the exterior body 12 and the sealing plate 14 are then welded to seal the exterior body 12. Then, a non-aqueous electrolyte is injected into the battery case 10 via the liquid injection hole 15 in a conventionally known method. The wound electrode body 20 is impregnated with the injected non-aqueous electrolyte. The secondary battery assembly in which the wound electrode body 20 and the non-aqueous electrolyte are housed in the battery case 10 is constructed in this way.

The first step S2 includes performing initial charging of the secondary battery assembly. In this step, the secondary battery assembly obtained in the assembling step S1 is subjected to initial charging using known discharging and charging means. A good-quality coating can be formed by performing this step. In this step, the secondary battery assembly is charged so that the depth of charge (hereinafter also appropriately referred to as "SOC: state of charge") of the secondary battery assembly should reach a desired depth of charge. The depth of charge is preferably 5% or larger, more preferably 10% or larger. In contrast, the depth of charge is preferably 50% or lower, more preferably 40% or lower, and still more preferably 30% or lower. The temperature condition during the initial charging is preferably 45° C. or lower, more preferably 15° C. to 35° C., and still more preferably 20° C. to 30° C. The charging rate for initial charging is not particularly restricted and may be, for example, 1 C or less. Although not particularly restricted, the first step S2 is preferably performed in a state where the liquid injection hole 15 is opened (that is, the battery case 10 is opened) from the point of view of releasing the gas produced by performing this step.

Figure 8:
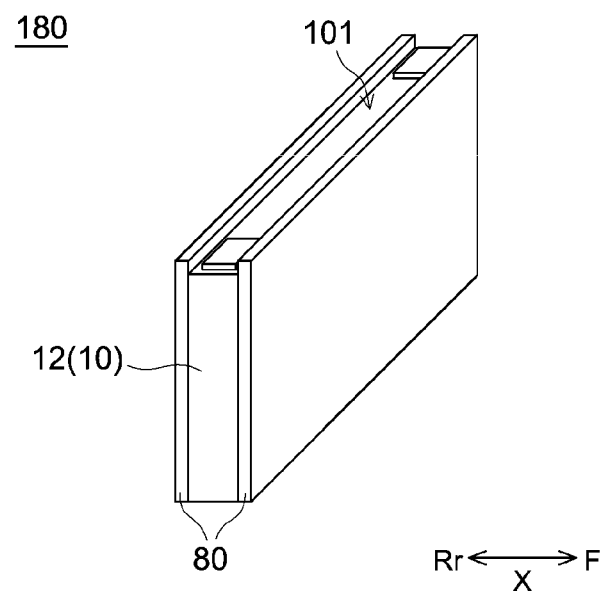
FIG. 8 is a perspective view of the restrained body in the production method according to the first embodiment.

Although not particularly restricted, the secondary battery assembly may be restrained after the first step S2 from the point of view of the gas movement and diffusion in the wound electrode body 20 or the gas release to the outside of the wound electrode body 20. The second step S3 is preferably performed in a condition where the secondary battery assembly is restrained. It is recommended to restrain the secondary battery assembly 101 in the depth direction X (that is, the thickness direction of the wound electrode body 20 (see FIG. 3 or the like)) of the battery case 10, as illustrated in FIG. 8. Specifically, it is recommended to dispose a pair of restraining jigs 80 so as to face the entire surfaces of a pair of large-area sidewalls 12b (see FIG. 1) of the battery case 10 (exterior body 12).

In the above manner, a restrained body 180 including a secondary battery assembly 101 and a pair of restraining jigs 80. Then, for example, a predetermined restraining pressure can be imparted to the secondary battery assembly 101 by bridging both edges (that is, a pair of restraining jigs 80) in the depth direction X of the restrained body 180 with restraining belts. Although not particularly restricted, the restraining pressure is, for example, 1 kN or higher, preferably 3 kN to 15 kN, more preferably 6 kN to 10 kN. Alternatively, a predetermined restraining pressure may be imparted to each secondary battery assembly 101 by arranging a plurality of restrained bodies 180 in the depth direction X and bridging the restrained bodies at both ends with restraining belts. In this case, an elastic body such as a spring should be disposed between the restrained bodies 180 from the point of view of imparting uniform restraining pressure to each secondary battery assembly 101.

The second step S3 includes, after the first step S2, setting the temperature of the wound electrode body 20 to 50° C. or lower and keeping this state for at least 72 hours. Although the details are described below, gas produced in the first step S2 is sufficiently released to the outside of the wound electrode body 20 by performing this step. The depth of charge of the secondary battery assembly in the second step S3 is preferably 25% or lower, more preferably 20% or lower. The depth of charge is preferably 5% or larger, more preferably 10% or larger. The depth of charge is preferably, for example, 10% to 15%. Note that, for achieving a suitable depth of charge in this step, the secondary battery assembly after the first step S2 may be discharged or may not be discharged.

The temperature condition in the second step S3 may be appropriately set within the above range. The temperature condition is preferably 45° C. or lower, more preferably 40° C. or lower. The temperature condition is, for example, 0° C. or higher, preferably 5° C. or higher, more preferably 10° C. or higher, still more preferably 15° C. or higher. When the temperature of the secondary battery assembly exceeds 50° C. after the first step S2, it is preferred not to maintain the temperature over 120 seconds.

The maintaining time (left time) of the secondary battery assembly in the second step S3 may be appropriately set within the above range. The maintaining time is, for example, 72 hours or longer, preferably 144 hours or longer, and may be 200 hours or longer. Although not particularly restricted, the upper limit of the above maintaining time may be, for example, 336 hours or shorter, or 300 hours or shorter from the point of view of efficiently obtaining the effect of the technique disclosed herein. In some embodiments, if the secondary battery assembly is not restrained, the maintaining time is preferably set to 144 hours or longer from the point of view of more efficiently obtaining the effect of the technique disclosed herein.

This production method may further include a third step S4 and a fourth step S5. The third step S4 includes performing charging of the secondary battery assembly after the second step S3. In this step, charging is performed using the above discharging and charging means so that the depth of charge of the secondary battery assembly after the second step S3 should be within the desired range. The depth of charge is preferably 5% or higher, more preferably 10% or higher, and still more preferably 15% or higher. In contrast, the depth of charge is preferably 50% or lower, more preferably 40% or lower. The temperature condition of initial charging is preferably 45° C. or lower, more preferably 15° C. to 35° C., still more preferably 20° C. to 30° C. The charging rate for initial charging is not particularly restricted and may be appropriately set, for example, to 1 C or less. Note that when the secondary battery assembly is restrained as described above, it is recommended to release the restraint at the start of this step.

The fourth step S5 includes aging at a high temperature on a secondary battery assembly after the third step S4. High-temperature aging is a treatment for retaining the secondary battery assembly in a high-temperature environment while the charged state is maintained. Here, the secondary battery assembly after the third step S4 is placed in a high-temperature environment while the depth of charge is kept, and high-temperature aging is then started. The temperature in the high-temperature aging is not particularly restricted and may be, for example, 50° C. or higher, may be 55° C. or higher, and may be 80° C. or lower and may be 70° C. or lower. As stated above, a non-aqueous electrolyte secondary battery that is ready for use can be produced by performing the production method disclosed herein.

Figure 9:
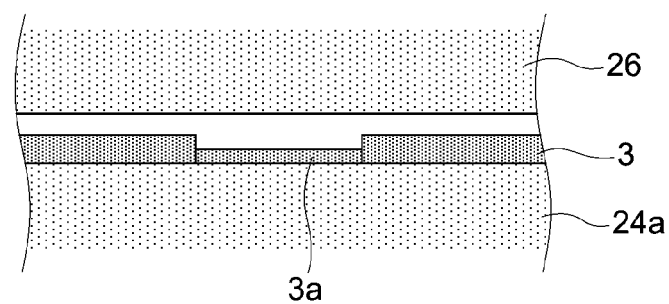
FIG. 9 is a schematic view for explaining the effect of the production method according to the first embodiment.

The consideration of the present inventors about the mechanism for achieving the effect of the technique disclosed herein is described with reference to FIGS. 5 and 9. However, it is not intended to limit the mechanism of the effect to those described in the following. When the secondary battery assembly is maintained at a non-high temperature of 50° C. or lower for at least 72 hours in the second step S3 after the initial charging, the gas G produced in the initial charging of the first step S2 moves from a part between the separator 26 and the negative electrode active material layer 24a and is eventually released to the outside of the wound electrode body during the maintaining time. Next, non-aqueous electrolyte components as donors of coating components react with a negative electrode active material and are decomposed in a non-high temperature state, and good-quality coating 3a is additionally formed (see FIG. 9) in a part where the gas G exists and no good-quality coating is formed (good-quality coating unformed part) (see FIG. 5). Therefore, even if the secondary battery assembly is placed in a high-temperature state in the fourth step S5, a rapid reaction between the non-aqueous electrolyte components and the negative electrode active material at a high temperature is suppressed. Due to this feature, the formation of poor-quality coatings (black regions) in the negative electrode plate is suppressed.

The production method disclosed herein can provide a non-aqueous electrolyte secondary battery in which the formation of black regions is suppressed. The effect for suppressing the formation of black regions can be evaluated, for example, by disjointing the wound electrode body after high-temperature aging and observing a negative electrode plate by the eye. In addition, the effect can be evaluated by determining the average plate resistance Rave and the maximum plate resistance Rmax of the winding start edge region in the negative electrode plate and then calculating a ratio (Rmax/Rave) of these. The effect may be evaluated as effective when the ratio (Rmax/Rave) is 2.7 or less (preferably 2.5 or less, more preferably 2.0 or less, further preferably 1.5 or less). Although not particularly restricted, the lower limit of the ratio (Rmax/Rave) may approximately be 1.0. An example of a method for calculating the average plate resistance Rave and the maximum plate resistance Rmax is as described in the following examples.

Alternatively, the effect can be evaluated by measuring the area in which black regions are formed in the winding start edge region. For example, an image of the winding start edge region is first acquired using a commercially available image acquiring device (for example, a camera or the like). Next, the formation area of black regions is measured using image analysis software. Then, a proportion (%) of the formation area of black regions when the area of the winding start edge region is regarded as 100% is calculated. The evaluation criteria of black region formation include, for example, comparing image data of an electrode surface before discharging and charging and an electrode surface after discharging and charging (after washing with an electrolyte in both cases) by binarization and determining whether or not local discoloration is observed. Furthermore, when a local resistance value increases with respect to the corresponding part extracted simultaneously, the same kind of discoloration is determined as a black region. The effect may be evaluated as effective when the proportion is, for example, 3.0% or less (preferably 1.0% or less, more preferably 0.5% or less).

Alternatively, evaluation may be made by dividing the winding start edge region into 1 cm×1 cm sections and counting the number of sections in which black regions are formed. For example, the presence or absence of black regions in each section is determined using image analysis software. Then, the number of sections in which black regions are formed is counted, and the ratio (the number of sections in which black regions are formed/the total number of sections) is calculated. The effect may be evaluated as effective when the ratio is, for example, 0.3 or less (preferably 0.2 or less, more preferably 0.1 or less). Incidentally, the evaluation criteria of the black region formation in this method are as described above.

EXAMPLES

Hereinafter, test examples relating to the present invention are described. Note that the content of the test examples described hereinafter is not intended to limit the present invention.

Assembling Step

Lithium-nickel-cobalt-manganese composite oxide (NCM) as a positive electrode active material, polyvinylidene fluoride (PVdF) as a binder, and acetylene black (AB) as a conductive material were weighed such that the mass ratio NCM:PVdF:AB should be 98:1:1, and mixed in N-methyl-2-pyrrolidone (NMP) to prepare positive electrode slurry. This positive electrode slurry was applied to both surfaces of a long belt-shaped positive electrode core body (an aluminum foil with a thickness of 18 μm) and dried. The resultant product was cut to a predetermined size and rolled by roll pressing to obtain a positive electrode plate provided with positive electrode active material layers on both surfaces of the positive electrode core body. The density of the positive electrode active material layer was 3.4 g/cm$^3$, and the thickness per layer was 110 μm. The length in the longitudinal direction of the positive electrode plate was 72 m, and the length of the width direction was 242 mm.

Graphite powder (C) as a negative electrode active material, a styrene-butadiene rubber (SBR) as a binder, and carboxymethyl cellulose (CMC) as a thickening agent were weighed such that the mass ratio C:SBR:CMC should be 98:1:1 and mixed in water to prepare negative electrode slurry. This negative electrode slurry was applied to both surfaces of a long belt-shaped negative electrode core body (a copper foil with a thickness of 12 μm) and dried. The resultant product was cut to a predetermined size and rolled by roll pressing to obtain a negative electrode plate provided with negative electrode active material layers on both surfaces of the negative electrode core body. The density of the negative electrode active material layer was 1.4 g/cm³, and the thickness per layer was 200 μm. The length in the longitudinal direction of the positive electrode plate was 80 m, and the length of the width direction was 252 mm.

Next, the positive electrode plate and the negative electrode plate prepared as above were laminated via a separator (separator sheet) such that the positive and negative electrode plates face each other. This laminate was wound in the sheet longitudinal direction to construct a wound electrode body as illustrated in FIG. 4. The separator was provided with a substrate of a polyolefin porous layer and a heat resistant layer containing alumina and a resin binder. The thickness of the substrate was 16 μm, and the thickness of the heat resistant layer was 4 μm. The heat-resistant layer was formed on the surface on the positive electrode plate side. The length in the longitudinal direction of the separator was 82 m, and the length in the width direction was 260 mm.

The dimensional relationship of the wound electrode body constructed as above is as follows:

W: 8 mm;
L1: 260 mm; and
H: 82 mm.

The numerals and symbols are as illustrated in FIG. 3. Specifically, W denotes the thickness of the wound electrode body 20. L1 was the width of the wound electrode body 20. H was the height of the wound electrode body 20.

Next, the wound electrode body and the lid of the battery case were connected via the positive electrode current collector and the negative electrode current collector. This product was inserted into a case main body, and the case main body and the lid were welded. Next, a non-aqueous electrolyte was injected from the liquid injection hole of a battery case (sealing plate). A non-aqueous electrolyte used was prepared by dissolving $LiPF_6$ as a supporting electrolyte at 1 mol/L and vinylene carbonate (VC) as an additive (a film-forming agent) at a concentration of 0.3% by weight were dissolved in a mixed solvent containing ethylene carbonate (EC), ethyl methyl carbonate (EMC), and dimethyl carbonate (DMC) in a volume ratio (25° C., 1 atm) EC:EMC:DMC of 30:40:30. A test secondary battery assembly was constructed in this way.

Example 1

—First Step—

A non-aqueous electrolyte was injected into a battery case as mentioned above, and initial charging was performed under an environment of nitrogen atmosphere at 25° C. and 1 atm in a state where the injection hole of the sealing plate was opened (without sealing). In the initial charging, charging was performed at a current of 0.3 C until the SOC reached 15% with respect to the specified capacity of the test secondary battery assembly.

—Second Step—

The test secondary battery assembly was left for 72 hours under an environment of nitrogen atmosphere at 25° C. and 1 atm in a state where the liquid injection hole of the sealing plate was opened (without sealing).

—Third Step—

Next, the liquid injection hole of the sealing plate was sealed by a sealing member to seal the battery case tightly. Then, charging was performed at a current of 0.5 C until the SOC reached 35% with respect to the specified capacity of the test secondary battery assembly.

—Fourth Step—

Next, the test secondary battery assembly was placed under an environment at 60° C. and left for 15 hours. Finally, a test secondary battery according to Example 1 was prepared in this way.

Examples 2 and 3

Steps from the first step to the fourth step were performed in the same manner as Example 1, except that the left time in the second step was set to a time listed in the corresponding column in Table 1, and a test secondary battery assembly according to each example was thereby prepared.

Examples 4 to 6

The test secondary battery assembly after the first step was restrained. Specifically, the test secondary battery assembly was restrained by a pair of restraining plates illustrated in FIG. 8 from both sides in the thickness direction. The restraining pressure at this time was 6 kN. In the second step, the test secondary battery assembly was placed for the time listed in the corresponding column in Table 1. After the second step, the restraint of the test secondary battery assembly was released. Except these, steps from the first step to the fourth step were performed in the same manner as Example 1, and a test secondary battery assembly according to each example was thereby prepared.

Example 7

After the first step, the second step was not performed. Except that, the third step and the fourth step were performed in the same manner as Example 1, and a test secondary battery assembly according to the present example was thereby prepared. Note that the mark "-" denoted in the "second step" column in Table 1 represents that the second step is not performed.

Evaluation on Formation of Black Regions

The test secondary battery assemblies according to Examples 1 to 7 prepared in the manner mentioned above were discharged at a current of 0.5 C until the depth of charge reached 0% with respect to the specified capacity of the test secondary battery assembly. Next, the test secondary battery in each example was disjointed, and a negative electrode plate was washed with a washing liquid (dimethyl carbonate (DMC), 100 vol %) and dried. The negative electrode plate after drying was observed by the eye for the presence or absence of blackened parts. With respect to the disjointed negative electrode plate, a half-circle of winding was taken as 1 T (turn). The number of turns in which the formation of black regions was observed by the eye in the total 35 T of the negative electrode plate is indicated in the "black regions (out of the total 35 T in the negative electrode plate)" column in Table 1. In the corresponding column in Table 1, the number "0" indicates that the formation of black regions was not observed.

Measurement of Plate Resistance of Negative Electrode Plate

The negative electrode plate on which the presence or absence of the black regions was observed as described above was measured for the resistance on a plate surface using an alternating current impedance method. Then, the resistance value (Ω) was calculated by fitting an equivalent circuit to the obtained Cole-Cole plot (Nyquist plot). The measurement was performed in a two-terminal method using an electrochemical impedance device (Solartron 1250E, manufactured by Solartron Metrology). First, a winding start edge region of a negative electrode plate (here, a region from the winding start edge toward the other end in the longitudinal direction of the negative electrode plate by a predetermined length) was cut and used as a measurement sample. This measurement sample was divided into 1 cm×1 cm sections, and the resistance value of each section was calculated using the measurement device. Next, the average of the resistance values in obtained sections was calculated to obtain an average plate resistance Rave. The maximum in resistance values in each obtained section was taken as the maximum plate resistance Rmax. Then, a ratio (Rmax/Rave) was calculated. The corresponding column in Table 1 shows the results.

Measurement of Capacity Maintaining Rate

The test secondary battery after the fourth step was discharged at a current of 0.5 C until the battery voltage reached 3.0 V. Next, the test secondary battery was charged at a current of 0.5 C until the battery voltage reached 4.1 V. Next, the test secondary battery was discharged at a current of 0.5 C until the battery voltage reached 3.0 V. The capacity of the test secondary battery at this time was defined as an initial capacity. The test secondary battery after the measurement of the initial capacity was subjected to 500-cycle discharging and charging at a current of 0.3 C and a voltage between 3.0 V to 4.1 V. The battery capacity after the 500 cycles was acquired, and the acquired value was taken as a post-endurance capacity. Then, using the initial capacity and the post-endurance capacity, a capacity retention rate (%) in the cycle test was calculated on the basis of the following formula (1): Capacity retention rate (%)=(post-endurance capacity/initial capacity)×100 (1) The corresponding column in Table 1 shows the results.

results of Examples 1 to 3 and Examples 4 to 6 confirmed that the effect of suppressing the formation of black regions could be enhanced by performing the second step in a state where the secondary battery assembly was restrained. Furthermore, it was found that the effect of suppressing the formation of black regions could be more greatly enhanced by prolonging the left time in the second step.

Second Embodiment

Figure 10:
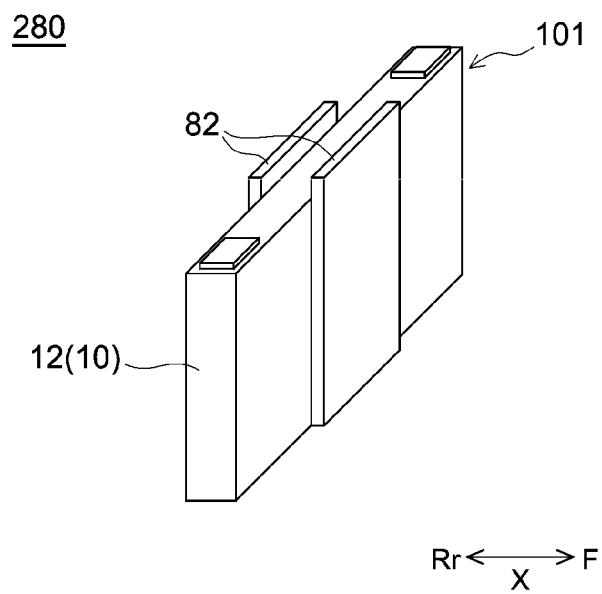
FIG. 10 is a perspective view of a restrained body in the production method according to a second embodiment.

In the first embodiment, a pair of restraining jigs 80 are disposed so as to face the entire surfaces of a pair of large-area side walls 12b (see FIG. 1) of the battery case 10 (exterior body 12), as illustrated in FIG. 8. However, it is acceptable as long as a predetermined restraining pressure is imparted at least on the central part 201 of the wound electrode body 20, and the shape, dimensions, and the like of the restraining jigs are not limited as long as the predetermined restraining pressure can be imparted. It is recommended, as illustrated in FIG. 10, to sandwich the secondary battery assembly 101 by a pair of restraining jigs 82 in the depth direction X of the battery case 10 (that is, the thickness direction of the wound electrode body 20 (see FIG. 3 or the like)) in order to impart a predetermined restraining pressure on the central part 201 of the wound electrode body 20. In this manner, a restrained body 280 including a secondary battery assembly 101 and a pair of restraining jigs 82 are constructed.

Using the restraining jigs 82 imparts a predetermined restraining pressure on the central part 201 of the wound electrode body 20 but does not impart restraining pressure on the edge 202 and the edge 203. Imparting the restraining pressure selectively on the central part 201 can promote the gas release from the central part 201. Note that the production method according to the second embodiment may be the same as the production method according to the first embodiment, except that the restraining jigs 82 are used.

TABLE 1

| | First step | | Second step | | | Third step | Fourth step | | Black regions (out of total 35 | | |
|---|---|---|---|---|---|---|---|---|---|---|---|
| | SOC after initial charging (%) | Temperature (° C.) | Restraint | Temperature (° C.) | Time (h) | SOC after charging (%) | Temperature (° C.) | Time (h) | T in negative electrode plate) | Rmax/ Rave | Capacity retention rate (%) |
| Example 1 | 15 | 25 | None | 25 | 72 | 35 | 60 | 15 | 12 | 2.7 | 81 |
| Example 2 | | | None | | 144 | | | | 8 | 2.0 | 83 |
| Example 3 | | | None | | 336 | | | | 6 | 1.2 | 89 |
| Example 4 | | | Restrained | | 72 | | | | 5 | 1.3 | 86 |
| Example 5 | | | Restrained | | 144 | | | | 1 | 1.1 | 91 |
| Example 6 | | | Restrained | | 336 | | | | 0 | 1.0 | 90 |
| Example 7 | | | — | | | | | | 13 | 3.6 | 78 |

Figure 11:
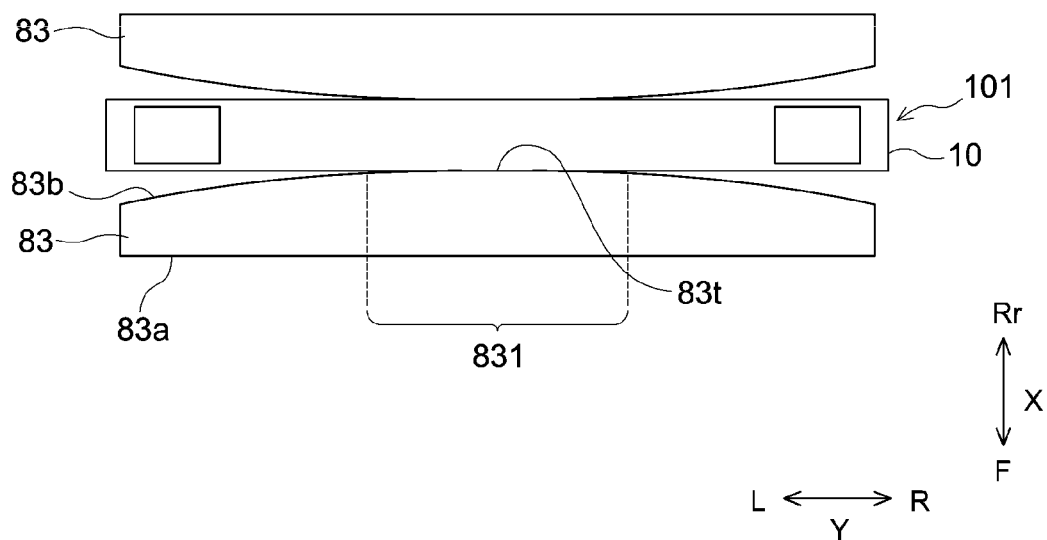
FIG. 11 is a top view of a restrained body in the production method according to a third embodiment.

As indicated in Table 1, a comparison between Examples 1 to 6 and Example 7 confirmed that the formation of the black regions in the negative electrode plate could be suppressed by leaving a secondary battery assembly for at least 72 hours in the second step after the initial charging in the first step. Furthermore, it was confirmed that the ratio (Rmax/Rave) was 2.7 or less, and the occurrence of the resistance unevenness in the negative electrode plate could be suppressed by performing the second step. Furthermore, it was confirmed that deterioration of battery performances (capacity retention rate in this case) was suppressed by performing the second step. A comparison between the Third Embodiment Alternatively, restraining jigs 83 illustrated in FIG. 11 may be used as another example. It is recommended, as illustrated in FIG. 11, to sandwich the secondary battery assembly 101 by a pair of restraining jigs 83 in the depth direction X of the battery case 10 (that is, the thickness direction of the wound electrode body 20 (see FIG. 3 or the like)). In this manner, a restrained body 380 including a secondary battery assembly 101 and a pair of restraining jigs 83 are constructed.

Here, the restraining jigs 83 each have a flat wide surface 83a and a curved surface 83b opposing the wide surface 83a. The curved surface 83b faces the large-area sidewall 12b of the battery case 10 and curves toward the large-area sidewall 12b. A restraining part 831 including a curve apex 83t on the curved surface 83b is in contact with the large-area sidewall 12b. Here, the position of the curve apex 83t and the length in the width direction Y of the restraining part 831 are not particularly restricted and may be appropriately set such that a predetermined restraining pressure can be imparted on the central part 201 of the wound electrode body 20 by restraining. Other parts excluding the restraining part 831 on the curved surface 83b are not in contact with the large-area sidewall 12b.

Using the restraining jigs 83 imparts a predetermined restraining pressure on the central part 201 of the wound electrode body 20 but does not impart restraining pressure on the edge 202 and the edge 203. Imparting the restraining pressure selectively on the central part 201 enables to promote the gas release from the central part 201. Note that the production method according to the third embodiment may be the same as the production method according to the first embodiment, except that the restraining jigs 83 are used.

As described above, specific embodiments disclosed herein are explained in detail, but these are mere examples and do not limit the scope of claims. The invention disclosed herein encompasses variations and modifications of the above specific embodiments changed or modified in various ways.

What is claimed is:

1. A method for producing a non-aqueous electrolyte secondary battery that comprises
    a flat-shaped wound electrode body in which a belt-shaped positive electrode plate and a belt-shaped negative electrode plate are wound, with a belt-shaped separator being intervened therebetween;
    a non-aqueous electrolyte; and
    a battery case that houses the wound electrode body and the non-aqueous electrolyte,
    the negative electrode plate comprising a negative electrode core and a negative electrode active material layer formed on the negative electrode core, and
    the negative electrode active material layer having a length of at least 20 cm in a winding axis direction of the wound electrode body,
    the method comprising:
    an assembling step of placing the wound electrode body and the non-aqueous electrolyte in the battery case to construct a secondary battery assembly;
    a first step of performing initial charging on the secondary battery assembly, wherein the secondary battery assembly is charged so that the state of charge (SOC) of the secondary battery assembly is 50% or less; and
    a second step, wherein the secondary battery assembly after the first step is maintained in a state with a SOC of 50% or less and a temperature of 50° C. or lower and this state is maintained for at least 72 hours.

2. The production method according to claim 1, wherein the secondary battery assembly is restrained in a thickness direction of the wound electrode body in the second step.

3. The production method according to claim 1, wherein the battery case comprises an exterior body that comprises an opening and a bottom part opposite to the opening, and a sealing plate that seals the opening, and
    the wound electrode body is arranged in the exterior body, wherein the winding axis is parallel to the bottom part.

4. The production method according to claim 1, wherein in the first step the secondary battery assembly is charged so that the SOC is 5% or larger and 30% or less.

5. The production method according to claim 1, wherein the first step is performed in a state where the battery case is opened.

6. The production method according to claim 1, wherein the second step is performed in a state where the battery case is opened.

7. The production method according to claim 1, wherein the battery case is sealed after the second step.

8. The production method according to claim 1, wherein the SOC of the secondary battery assembly is 25% or less in the second step.

9. The production method according to claim 1, further including:
    a third step of performing charging on the secondary battery assembly after the second step, wherein in the third step, the secondary battery assembly is charged so that the SOC is 50% or lower; and
    a fourth step of performing aging at 50° C. or higher and 80° C. or lower on the secondary battery assembly after the third step.

10. The production method according to claim 9, wherein in the third step, the secondary battery assembly is charged so that the SOC is 40% or less.

11. The production method according to claim 9, wherein:
    the second step is performed in a condition where the secondary battery assembly is restrained, and
    the restraining of the secondary battery assembly is released before the third step.

* * * * *